Dec. 12, 1961  R. L. BEST ET AL  3,012,891
COCOA-BUTTER SUBSTITUTE
Filed June 4, 1959
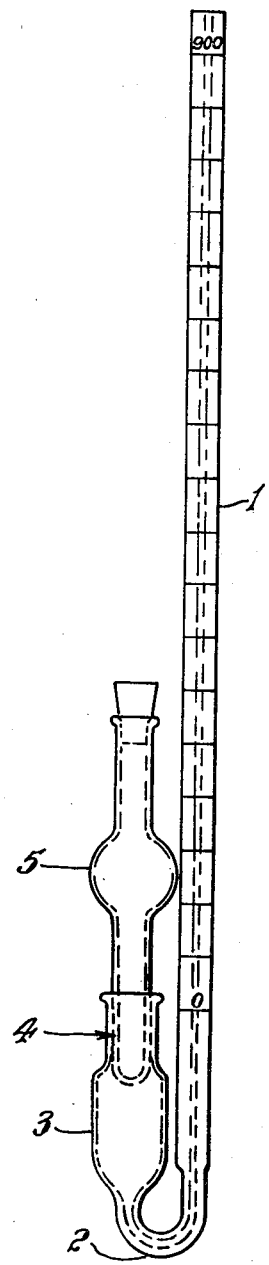
INVENTORS.
RONALD LOBLEY BEST,
ALAN CHARLES DAVIES,
STANLEY PAUL &
CORNELIS JOHANNES SOETERS
BY
their ATTORNEYS.

United States Patent Office 3,012,891
Patented Dec. 12, 1961

3,012,891
COCOA-BUTTER SUBSTITUTE
Ronald Lobley Best, Bexley Heath, England, Cornelis Johannes Soeters, Rotterdam, Netherlands, and Alan Charles Davies, Bebington, and Stanley Paul, Prenton, England, assignors to Lever Brothers Company, New York, N.Y., a corporation of Maine
Filed June 4, 1959, Ser. No. 818,059
Claims priority, application Great Britain June 11, 1958
14 Claims. (Cl. 99—118)

This invention relates to cocoa butter substitutes and to produce containing them.

The main use of cocoa butter is in chocolate. In the manufacture of good quality chocolate, the "nib," or decorticated cocoa bean, is ground up and to it are added sugar, flavourings and additional cocoa butter, together with milk powder or milk crumb in the case of milk chocolate. The amount of additional cocoa butter depends upon the type of chocolate and is usually between 25% and 100% of the amount of cocoa butter already present in the ground "nib." The cocoa butter content of such chocolate is largely responsible for its physical characteristics; cocoa butter is unusual among naturally-occurring fats in that it is normally a brittle solid up to about 25° C., has a relatively narrow melting range and is almost completely liquid at 35° C.

The invention is based on the discovery that certain fractions derived from shea butter are of particular value as substitutes for cocoa butter in chocolate and in other products in which cocoa butter is normally used, such as confectionery, when used in admixture with whole palm oil or with fractions derived from palm oil ("shea butter" is usually derived from the seeds of the species *Butyrospermum parkii* or *Bassia parkii*).

Cocoa butter is expensive and its price is subject to large fluctuations. For many years, therefore, attempts have been made to provide from readily available and cheaper fats a product that can be used to replace at least part of the cocoa butter in chocolates and other confectionery that normally contains cocoa butter. For such a product to be acceptable to chocolate manufacturers it must have a combination of properties which is very difficult to realise. Probably the most exacting requirements are those for a product capable of replacing part, for example, 25 to 50% of the cocoa butter in high grade chocolates. To be suitable for this purpose the product must, when mixed with cocoa butter, give a mixture which is homogeneous, is solid at ordinary atmospheric temperatures but substantially liquid at body temperatures, and which at each temperature within the range to which cocoa butter is subjected in making chocolate, has physical characteristics so close to those of cocoa butter, that the mixture can be used in place of cocoa butter without upsetting standard methods of manufacture and of assessment of the chocolate products. Natural fats are complex mixtures and when two fats are mixed the physical properties of the mixture, especially the thermal properties as indicated by cooling curves and dilatations, softening points and hardness figures at various temperatures, cannot in general be predicted in any simple way. For instance, two fats which are both hard at a particular temperature may give a mixture at that temperature which is much softer than either component, and a mixture of two fats commonly has dilatation properties over certain temperature ranges very different from those of either component. Hence the provision of satisfactory cocoa-butter substitutes has proved very difficult.

We have now found that products that simulate cocoa butter closely over a wide temperature range and that can be used in making high grade chocolates and as well as in other confectionery products that normally contain cocoa butter, can be obtained by mixing palm oil, or fractions of palm oil of iodine value at least 25 and dilatation not greater than 600 at 35° C., with shea butter fractions of iodine value not greater than 80 and dilatation not less than 1900 at 20° C. and not less than 1500 at 35° C. By mixing such products, that is binary mixtures of shea butter fraction of the specified characteristics and palm oil or palm oil fractions of the specified characteristics, with cocoa butter we have obtained ternary mixtures having cooling curves very close to those of cocoa butter itself and having dilatations at 20 and 35° C. sufficiently close to those of cocoa butter itself to make the production of high grade chocolate from such ternary mixtures possible without upsetting the normal routine.

In this specification, unless otherwise stated, all parts and percentages are by weight and the dilatations are those obtained by the method described below.

Whole palm oils used in mixtures according to the invention will generally have an iodine value of, for example 50 to 57. Suitable palm oil fractions for use according to the invention are those having iodine values not less than 25, preferably 30 to 57, for example 47 to 55 and particularly 40 to 50.

Palm oil fractions which are particularly useful for certain purposes are those having iodine values of 30 to 43, preferably not higher than 40, and especially within the range 32 to 36, dilatations at 20° C. not less than 1500, especially not less than 1700 and dilatations at 35° C. not greater than 600, preferably not greater than 500 and still better not greater than 300.

Shea butter fractions for use according to the invention should, as indicated above, have iodine values not greater than 80. Useful fractions are, for instance, those having iodine values of 50 to 80, whilst more preferable fractions have iodine values in the range 40 to 50. The most highly preferred fractions have iodine values in the range 29 to 40. The iodine value of the shea fractions given above are inclusive of the unsaponifiable content of the shea fractions, but it is possible to express the iodine values as values exclusive of unsaponifiable content by calculation from the iodine value of the fatty acids of the fraction excluding unsaponifiable matter prepared according to the description in column 4, lines 1–28. From this standpoint it is preferred to use shea butter fractions of iodine value, exclusive of unsaponifiable content not greater than 43, preferably within the range 29 to 40.

The shea butter fractions used are of dilatation not less than 1900 at 20° C. and not less than 1500 at 35° C. The fractions may for instance be of dilatation between 1900 and 2800 at 20° C. and between 1500 and 2750 at 35° C. Preferably, fractions of dilatation not less than 2200 at 20° C. and not less than 2000 at 35° C. are used. Shea butter fractions of dilatation at 20° C. over 2500, for instance 2800 have been found satisfactory for use according to the invention although the most useful fractions are not necessarily those having the highest dilatations.

The process and product in which a mixture of shea butter fractions with whole palm oil or palm oil fractions according to the invention may be used will depend on the iodine value and, in certain cases, on the dilatations of the palm oil fractions or mixtures, the desired quality of the product and the degree of replacement of cocoa butter by the mixture in the product.

Proportions in which shea butter fractions may be mixed with whole palm oil or palm oil fractions according to the invention vary over a wide range. In general the palm oil glycerides may with advantage constitute some 25 to 80%, and especially 25 to 65%, of the composition.

When using whole palm oil in admixture with shea buttter fractions it is preferred that the palm oil should constitute 35% to 50% of the mixture and the shea butter fractions, correspondingly, from 65 to 50% of the mixture although as much as 65% to 70% of palm oil may be used in mixtures with certain shea butter fractions. When using palm oil fractions, mixtures containing as little as 10% of shea butter fractions with correspondingly 90% of palm oil fractions may be used, whilst mixtures containing as much as 75% of shea butter fractions and as little as 25% of palm oil fractions have been found useful. Preferred mixtures contain 35% to 40% shea butter fractions and 65% to 60% palm oil fractions. Mixtures containing 50% shea butter fractions and 50% of palm oil fractions have also given good results.

The mixtures of shea butter fractions with whole palm oil or with palm oil fractions should preferably be of dilatation at 20° C. not less than 1400, for instance 1500 to 1700 or more, and dilatation at 35° C. not substantially greater than 500. Excellent results have been obtained with mixtures of dilatation at 20° C. not less than 1700, for instance 1900 to 2100, and dilatation at 35° C. not greater than 200, for instance, from 0 to 100 or 150.

The mixtures of shea butter fractions with palm oil or palm oil fractions can be mixed with cocoa butter before incorporation in, for example, chocolate, and the invention includes mixtures of cocoa butter with shea butter fractions and whole palm oil or palm oil fractions, the relative proportions of shea butter fractions to whole palm oil or palm oil fractions being within the ranges disclosed.

Because of the relatively high cost of cocoa butter, a substitution of even 5% of the cocoa butter by a mixture of shea butter fractions and whole palm oil or palm oil fractions according to the invention, may be useful. Generally, at least 25% to 30% by weight of the cocoa butter normally used in the final product will be replaced, whilst replacement of 50% of the cocoa butter or even 75% or more may be carried out.

Palm oil fractions for use in admixtures with shea butter fractions according to the invention are prepared by removing from the whole palm oil at least a proportion of the low melting glyceride fraction of palm oil: that is, a fraction which is liquid at normal room temperature (about 20° C.) For preferred fractions, at least 40%, preferably 60% by weight of the palm oil, of this low melting glyceride fraction is removed. It is also preferable, particularly in the case where a high proportion of the low melting glyceride fraction is removed, to remove also a proportion of the highest melting glyceride fraction, that is a fraction containing fully saturated glycerides. Most preferably the proportion of the highest melting glyceride fraction removed is of the order of 5% to 15% by wieght of the palm oil.

The fractionation of the palm oil may be carried out by fractional crystallisation from a solvent. When only a low melting glyceride fraction is to be removed, a single crystallisation may suffice, but it may be advantageous to carry it out in two stages; similarly, when a proportion of the highest melting glyceride fraction is also to be removed two or more crystallisations can be used. In the following description of fractionation procedure, substantially anhydrous acetone, that is acetone not containing more than 2% of its weight of water, is used as the solvent but other solvents, for example, substantially anhydrous ether may be used.

In order to remove the low melting glyceride fraction in a single crystallisation, an amount of acetone between 3 and 10 mls. per gram of fat can be used. This amount of acetone can be reduced if the number of crystallisations is increased, or if a large number of washes is used. The temperature of crystallisation depends on the conditions used, in particular the solvent ratio. With ratios of the order given, temperatures of from about −3° C. to about 6° C. may be used.

Various cooling procedures may be used. The molten oil may be dissolved in acetone and then the solution cooled to the desired temperature. The solution may be allowed to cool undisturbed, but the time required is shortened considerably (20–30 minutes instead of many hours) if it is stirred throughout. Cooling may also be effected by distilling off part of the solvent under reduced pressure.

All crystallisations are preferably left at the crystallisation temperature until no further precipitation takes place. The precipitate may then be filtered off, preferably with the application of vacuum or pressure and then washed, either on or after removal from the filter, with chilled acetone at a temperature 1 to 2° C. lower than the crystallisation temperature.

An alternative procedure which has been found satisfactory is to draw off the mother liquor and washing liquors instead of filtering. In order to obtain crystals in a suitable form for this procedure, the oil-in-acetone solution should be above 30° C. before cooling commences and stirring should be carried out throughout the cooling. Under these conditions the crystals settle rapidly and the mother liquor can be drawn off. The degree of removal of the low melting glyceride fraction from the solid crystals will depend on the number of washes, but normally 4 to 6 will be sufficient. After each wash the wash liquor is drawn off, and can conveniently be used for crystallisation of the next batch of palm oil.

The removal of the highest melting glyceride fraction can be carried out by means of similar techniques, the ratio of acetone to oil being preferably in the range 4 to 20 ml. per gram of oil and the crystallisation temperature in the range of 15 to 30° C. This can be carried out before or after the removal of the low melting glyceride fraction, and may likewise be carried out as two or more separate crystallisations.

The palm oil may be refined before or after fractionation.

Shea butter fractions for use according to the invention can be prepared by removing from shea butter a fraction rich in unsaponifiable matter. Removal of this fraction can be carried out by precipitation by a solvent. In the following description of fractionation procedure substantially anhydrous solvents, for example, ether, light petroleum or isopropanol may be used with suitable modification of proportions and conditions which can be determined by trial and error. Removal of the fraction referred to above is preferably carried out by precipitation by acetone within the range 20 to 50° C. preferably at a temperature of less than 30° C. Frequently about 23 to 28° C. is used. The fraction removed usually constitutes about 2 to 5% by weight of the shea butter.

A low melting fraction which may amount to 40 or 45 to 70%, for example 50 to 60% or 55 to 65% of the shea butter may then be removed by a second crystallisation at a lower temperature, usually within the range −10° to +15° C., preferably above −5° C., more preferably within the range 0 to 10° C. The two crystallisations referred to above may be carried out in reversed order. That is to say, the crystallisation at the lower temperature may precede the crystallisation at the higher temperature. When using acetone, an amount of acetone of between 3 and 10 mls. per gram of fat is normally used. However, the greater the number of crystallisations which are carried out the less the proportion of solvent which is required. It is preferred to fractionate the shea butter before refining.

Any of the procedures which are indicated as suitable for the fractionation of palm oil from column 4, line 76 and column 5, lines 1–35, may be used for crystallising shea butter fractions, provided that modifications of temperature and amounts as indicated above for shea butter are observed.

The determination of the unsaponifiable content of shea butter or shea butter fractions according to the invention is carried out by the following method:

The shea butter or shea butter fraction (2.0 to 2.2 g.)

is accurately weighed into a flask and saponified by heating under reflux for one hour with 25 ml. of N/2 alcoholic potassium hydroxide solution. The resulting solution is transferred to a separating funnel using 11.0 ml. of water. The solution is extracted three times with amounts of 50 ml. of petroleum-ether (boiling point 40–60° C.). The extracts are combined and washed by swirling with 20 ml. of aqueous alcohol (70% by volume of alcohol) followed by removal of the aqueous alcohol phase. The wash with aqueous alcohol is then repeated several times but with vigorous shaking until the aqueous alcohol layer remains neutral to phenolphthalein. The final petrol solution is transferred to a weighed flask, the solvent removed by distillation and the residue dried to constant weight, adding and removing by distillation small quantities of acetone to facilitate drying. The weight of product is determined and calculated as percentage of unsaponifiable matter based on the original sample. The unsaponifiable matter is dissolved in 10 ml. of freshly boiled and neutralised 95% alcohol and the solution titrated with N/10 alcoholic NaOH solution using phenolphthalein as indicator. If the titration exceeds 0.1 ml. the experiment must be repeated using a fresh sample of shea butter or shea fraction.

*Fatty acids exclusive of unsaponifiable matter.*—The fatty acids exclusive of unsaponifiable matter may be obtained from the alkaline soap solution from which the unsaponifiable matter was extracted, and from the aqueous alcohol washes of the petrol solution of unsaponifiable matter. These solutions are combined, diluted with 200 ml. of water, acidified with sulphuric acid and the fatty acids extracted by shaking with ether. The ether extract is washed with water until the washings are neutral and the ether removed by evaporation followed by warming under vacuum. The residue consists of the fatty acids exclusive of unsaponifiable matter.

Dilatations according to the invention are to be construed as determined by the method described below with reference to the accompanying drawing.

The dilatometer consists of a graduated glass capillary tube 1 which has a volume of 900 cu. mms. within a length of 25 to 29 cms. and which must be accurately calibrated. The base of the graduated tube is joined by a U-shaped piece of capillary tubing 2 to a glass bulb 3, which has a volume of between 6.5 and 7.5 ml. The glass bulb 3 is surmounted by a female conical glass joint 4 (internal diameter, top 15 millimetres, base 12 millimetres, length 26 millimetres) into which may be inserted a ground glass stopper 5. The distance from the top of the joint on the bulb 3 to the further side of the U-shaped capillary tubing 2 is 70 millimetres.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two thirds of the height of the graduated capillary, these conditions are usually fulfilled. The dilatometer is reweighed to obtain the weight of fat added. The hollow stopper is then partly filled with lead shot. It is then placed in a water bath maintained at 60° C. ($\pm 0.1°$) and a reading of the level of the water in the capillary is made. This is the "base reading," $R_{60}$.

The filled dilatometer (or dilatometers) is chilled in an ice/water bath for 1½ hrs. It is then allowed to warm in an air bath to 26° C. at which temperature it is maintained for 40 hrs. It is then again chilled in an ice/water bath for 1½ hrs. and then placed in a water bath at 20° C. ($\pm 0.1°$ C.), the dilatometer being immersed to such a depth that the water level is above the middle of the ground glass stopper.

The position of the water meniscus in the capillary is read every half hour until two successive readings differ by no more than 2 mm.³. The final reading ($R_t$) is used in calculations.

A similar procedure is adopted again at 35° C.

Finally the dilatometer is heated again to 60° C. and the "base reading" is re-determined. If the initial and final "base reading" differ by more than 2 mm.³ the whole operation must be repeated.

*The calculation.*—The value of the dilatation is calculated from the following formula:

$$D_t = \frac{25(R_{60}-R_t)}{W} - A$$

where $D_t$ = dilatation at $t°$ C.
$W$ = weight of fat taken
$R_{60}$ = base reading (mm.³)
$R_t$ = reading of the capillary at $t°$ C. (mm.³), and
$A$ is given in the table below

| $t°$ C. | $A$ |
|---|---|
| 20 | 880 |
| 25 | 770 |
| 30 | 665 |
| 35 | 555 |

Examples 1 to 6 below show the preparation of shea butter fractions which can be mixed with whole palm oil to give mixtures containing 50 to 60% of the shea butter fraction, or with a palm oil fraction of iodine value 32 to 36 to give mixtures containing 25 to 50% of the shea butter fraction, or with palm oil fractions of iodine value 37 to 42 to give mixtures containing 40 to 60% of the shea butter fraction. These mixtures can be used as cocoa butter substitutes in making chocolate products.

The acetone referred to in the examples contained less than 1% of water.

*Example 1*

*Crystallisation I.*—Crude shea butter (300 g.) of iodine value 69 and acetone (900 ml.) were heated to 50° C. A cloudy solution was obtained. This solution was cooled to 23° C. with occasional stirring over about 15 minutes. The solution was allowed to stand for 1 hour at 23° C. and then filtered under vacuum. The precipitate was washed on the filter with acetone (100 ml.) at 23° C. This precipitate after removal of acetone consisted mainly of unsaponifiable matter and amounted to 15.6 g. (5.2% of the shea butter).

*Crystallisation II.*—The clear filtrate from the above crystallisation was cooled with gentle, steady stirring over 1 hour to 8° C. The bulk of the crystallisation took place at about 16–18° C. The mixture was filtered under vacuum as soon as a temperature of 8° C. was reached. The crystallisation flask was rinsed with acetone (100 ml.) at 8° C., this being used to wash the precipitate on the filter. The precipitate was pressed lightly then transferred to a beaker with acetone (300 ml.) at 8° C. The mixture was stirred in the beaker until a smooth paste was formed whilst keeping at 8° C., and was then filtered under vacuum and two washes of acetone (100 ml.) were poured on the cake, which was finally well pressed.

The product (amounting to 36% of the shea butter) had an iodine value of 35.8 and contained 1.3% of unsaponifiable matter. It had an iodine value excluding unsaponifiable matter of about 32.

*Example 2*

*Crystallisation I.*—Crude shea butter (300 g.) of iodine value 68.2 and free fatty acid content 12.6% as oleic acid was heated to 50° C. with acetone (900 ml.). A part of the unsaponifiable matter in the oil remained insoluble and the bulk of the solution was separated by decantation. This solution was allowed to cool to 23° C. and maintained at this temperature for 1½ hrs. The material which separated was removed by filtration under vacuum and amounted to 5 g. (1.7% of the shea butter).

*Crystallisation II.*—The filtrate from crystallisation I was cooled to 8° C. and maintained at this temperature for 3 hours with continuous slow stirring. The solution was then filtered under vacuum and washed (on the filter) with acetone (300 ml.) at 8° C., and finally well pressed. The product was removed from the filter and acetone was removed by distillation.

The product had an iodine value of 33.0 and a calculated iodine value excluding unsaponifiable matter of about 31. The product had the following dilatations: $D_{20}$, 2680 and $D_{35}$, 2550.

*Example 3*

Shea butter (300 g.) of iodine value 69 and free fatty acid content 8.0% as oleic acid, was heated to 60° C. with dry isopropanol (900 ml.). The resulting cloudy solution was cooled to 28° C., allowed to stand for 1 hour and then filtered under vacuum. The solid fraction so removed amounted to 4.8% of the shea butter.

The filtrate was warmed to 40° C. and then cooled during 1 hour to 22° C. The product was filtered under vacuum, removed from the filter and slurried with further isopropanol (300 ml.) at 22° C., and again filtered. The filter cake was washed with two portions of isopropanol (100 ml.) and well pressed. The product was removed from the filter, and the isopropanol removed by distillation. The product, amounting to 29% of the shea butter, had an iodine value of 32.2 and an iodine value excluding unsaponifiable matter of about 30.

*Example 4*

Neutralised shea butter (300 g.) of iodine value 69 and free fatty acid content 0.3% as oleic acid was crystallised from acetone as in Example 1. The product (38.3% of the shea butter) was of iodine value 39.7 and contained 2.2% of unsaponifiable matter.

*Example 5*

Shea butter (300 g.) of iodine value 69 and free fatty acid content 8.0% as oleic acid was crystallised from acetone as in Example 1 except that crystallisation I was omitted. The filter cake obtained was dissolved in boiling acetone (900 ml.) and cooled to 28° C. The solution was filtered under vacuum at this temperature. The acetone was removed from the filtrate and a product (29.7% of the shea butter) was obtained which had an iodine value of 34.2.

*Example 6*

Crude shea butter (4.54 kg.) of iodine value 69 was heated to 60° C. in a jacketed vessel and cold acetone (17 l.) was added with slow stirring so that the final temperature of the solution was 28° C. The mixture was allowed to settle for a few minutes and the clear upper layer decanted off, the residue was washed twice with acetone at 28° C. (3.4 l. each wash), each being settled and decanted off at 28° C. The combined decanted solutions were cooled to 8° C. with slow stirring over 1 hour. The solution was filtered under vacuum and washed twice with acetone (1.76 l. each wash).

After removal of acetone the solid fraction weighed 1.58 kgs., had an iodine value of 33.6 and an iodine value exclusive of unsaponifiable matter of 31.8, it had a dilatation at 20° C. of 2550 and a dilatation at 35° C. of 2500.

*Example 7*

300 g. of crude shea butter at 50° C. was added slowly with stirring to 900 ml. of substantially anhydrous acetone also at 50° C.; the mixture was cloudy due to precipitation of a proportion of the non-saponifiable part of the shea butter. Continuing stirring, the cloudy solution was slowly cooled to 8° C., a large fraction crystallising out at about 13° C. The solid fraction was filtered off on a Büchner funnel at 8° C. and washed on the filter with 300 ml. of acetone at 8° C., and pressed with a spatula until liquid ceased to be released.

The solid cake was melted up and freed from acetone by heat.

The yield was 149 g. 49.8% with an iodine value of 60.57, a non-saponifiable content of 9.04% and dilatation 2132 at 20° C., and 1600 at 35° C.

A mixture was made of equal parts of this shea butter fraction and palm fraction I.V., 36 and dilatation 1530 at 20° C. and 0 at 35° C. as used in Examples 11 and 12 the mixture was of dilatation 1640 at 20° C. and 101 at 35° C. Chocolates, both milk and plain were made incorporating this mixture by the method described in Example 8.

The chocolates when examined after 24 hours in the refrigerator and 24 hours at room temperature (23° C.) were found to be excellent in appearance and quite satisfactory in other respects.

*Example 8*

(a) *Preparation of shea butter fraction.*—Expelled crude shea butter (500 g.) was heated to 60° C. and poured in a thin stream into acetone (1500 ml.) at 20° C. with continuous stirring in a conical-bottomed vessel. Unsaponifiable matter precipitated in a dense flocculent form which settled quickly when stirring was stopped and it was run off from the bottom of the vessel. The precipitated unsaponifiable matter was washed by decantation with acetone at 25° C. (about 200 ml.) the decanted wash being added to the main bulk of acetone.

The main bulk was transferred to a 3-litre beaker, heated to 50° C. and then slowly cooled with continuous stirring to 8° C. The white crystalline precipitate was filtered off by suction on a Büchner funnel, washed three times with acetone at 8° C. (1000 ml.) and the remaining acetone evaporated off from the crystalline mass. The acetone-free fraction constituted 29.4% of the original shea butter and had an iodine value of 32.8.

(b) *Preparation of mixtures of shea butter fraction and whole palm oil.*—The whole palm oil used was the neutralised, unbleached, soap-free neutral oil derived from native West African palm oil having an iodine value of 54 and containing 5.5% free fatty acid. It was of dilatation 349 at 20° C., and 98 at 35° C. Mixtures of the whole palm oil with the shea butter fraction of section (a) were prepared in the proportions:

(1) 65% shea butter fraction: 35% palm oil
(2) 45% shea butter fraction: 55% palm oil
(3) 50% shea butter fraction: 50% palm oil (c) *Preparation of chocolate containing the mixtures of section (b).*—Plain chocolates were made according to the general formula:

400 g. "Refiner paste" of the following composition:
    Ground cocoa mass (containing 56% cocoa butter), 50%. Sugar, 50%. (The 400 g. refiner paste thus contained 112 g. cocoa butter.)
66 g. Additional fat. The total fat was thus 178 g.

The bowl of an end runner mill was warmed to 40° C., the refiner paste was added and the additional fat added slowly, with warming. The chocolate mix was then warmed to 60–65° C. and maintained at this temperature for two hours. The mill was then stopped and the chocolate mix poured into a 9" porcelain evaporating dish. The mix was stirred in a manner such that the formation of air bubbles was minimised, being slowly cooled until it became too stiff to stir easily. The chocolate mix was then again heated very gently to a point at which it was just pourable, care being taken to avoid overheating. The molten mix was poured into chilled (11–12° C.) moulds, any air bubbles being removed by vigorous tapping. The filled moulds were placed in a refrigerator at 11–12° C. After 48 hours the moulded bars of chocolate were removed from the moulds, stored at room temperature (19° C.) for 4 days and then examined.

Chocolates were made using the following additional fats: The mixtures 1, 2 and 3 of part (b).

Milk chocolates were made according to the general formula:

400 g. milk "refiner paste" of the following composition:
    Ground cocoa mass (containing 56% cocoa butter), 45%. Sugar, 37.5%.
    Dried full cream whole milk powder, 17.5%.
48 g. additional fat (total fat 172 g.).

The method used was the same as that used for the plain chocolate except that after the additional fat was added the chocolate mix was warmed to 45–50° C. instead of 60–65° C.

Milk chocolates were made using the same additional fats (1, 2 and 3 of section (b)) as were used in the plain chocolate with satisfactory results.

Example 9

(a) *Preparation of shea butter fraction.*—Expelled shea butter (5 kg.) was heated to 45° C. and mixed with acetone at 45° C. (15 litres) in a tin with conical bottom and bottom outlet. The mixture was cooled slowly with stirring to 26° C. and the precipitate rich in unsaponifiable material was left to settle. Settlement was good and sharp and the material did not stick either to the tin or the stirrer. It would not, however, run out from the bottom outlet, being in the form of fairly large pieces. The clear liquid was therefore decanted, with a sharp endpoint and the precipitate washed with acetone at 26° C. (5 litres) by stirring. Settlement was again very good and a clear decantate was obtained. The wash was added to the main bulk. The bulk was reheated to 45° C. and then cooled slowly with constant stirring in an ice-water bath to 8° C. and stabilised by stirring 5 minutes while being held at 8° C. The mixture was then transferred to a "percolator," provided with a metal gauze false bottom, covered with a cotton filter cloth, and the clear liquid drained off. The crystal mass was then washed with acetone at 8° C. (5 litres) and drained as before. The crystal mass was then removed from the "percolator" and the acetone removed from it by distillation. The yield was 41.3% of a material of iodine value 39.

The material was re-crystallised from acetone (18 litres) and given one 5-litre wash as before. The yield was now 31.7% of a material of iodine value 34 and dilatation 2722 at 20° C. and 2685 at 35° C. The material was neutralised and deodorised by conventional laboratory methods.

(b) *Preparation of chocolate.*—Plain and milk chocolates were made according to the methods described in Example 8, using the following mixtures as additional fats:

(1) 65% shea butter fraction of section (a): 35% palm oil
(2) 45% shea butter fraction of section (a): 55% palm oil
(3) 50% shea butter fraction of section (a): 50% palm oil The chocolates obtained had good snap and satisfactory physical characteristics.

Example 10

Plain and milk chocolates were made according to the methods described in Example 8, using as the additional fat a mixture of 65% of a palm oil fraction obtained by a single crystallisation of palm oil from acetone and having an iodine value of 42.2, a dilatation at 20° C. of 991 and a dilatation at 35° C. of 282 and 35% of the shea butter fraction of Example 9 (a). This mixture was of dilatation 1466 at 20° C. and 264 at 35° C. Both plain and milk chocolates made by this procedure had good snap and physical characteristics.

Example 11

A shea butter fraction was prepared by mixing hot shea butter with cold substantially anhydrous acetone in the proportions of 1 part by weight of shea butter to 2.4 of acetone so as to give a mixture having a temperature of 23° C. The resulting solution was cloudy owing to the presence of undissolved non-saponifiable substances. It was filtered and the filtrate cooled to 8° C. The solid fraction was separated and found to be of iodine value 37 and dilatation 2468 at 20° C. and 2305 at 35° C.

To the shea butter fraction of iodine value 37 obtained as described above there was added a proportion of olein fraction from previous shea butter fractionations to bring the iodine value up to 40. The mixture so obtained was of dilatation 2312 at 20° C. and 1895 at 35° C.

A 1:4 (by weight) solution of palm oil in acetone was cooled to 0° C., the solid fraction that separated was redissolved in acetone at 45° C. and cooled to 17° C. to separate high melting glycerides which were removed by settlement. The acetone solution was then decanted and the acetone distilled off to yield a palm oil fraction of iodine value 36 and dilatation 1530 at 20° C. and 0 at 35° C. By further fractionation in acetone of this palm oil fraction there was obtained a fraction of iodine value 32 and dilatation 1902 at 20° C. and 0 at 35° C.

A mixture was made in equal proportions by weight of the shea butter fraction of iodine value 37 and the palm oil fraction of iodine value 32. The mixture was of dilatation 2008 at 20° C. and 171 at 35° C. This mixture was used as the additional fat in making milk and plain chocolates by the methods described in Example 8 with satisfactory results.

Example 12

65 parts of palm oil fraction of iodine value 36 and dilatation 1530 at 20° C. and 0 at 35° C., prepared as described in Example 11, were mixed with 35 parts of a shea butter fraction of iodine value 33.5 and dilatation 2515 at 20° C. and 2407 at 35° C. prepared by a single fractionation from acetone of the fraction of iodine value 37 referred to in Example 11. The mixture was of dilatation 2060 at 20° C. and 0 at 35° C. It was used satisfactorily as described in Example 11.

Example 13

A mixture was made of equal parts of the shea butter fraction of iodine value 40 and the palm oil fraction of iodine value 36 both referred to in Example 12. This mixture was of dilatation 1762 at 20° C. and 139 at 35° C. It was used successfully in the same way as the mixtures of Examples 11 and 12.

Example 14

One part of molten crude shea butter of iodine value 65.7 and saponification value 181.1, containing 6% of unsaponifiable material was mixed with three parts of acetone and the mixture brought to a temperature of 26° C. and filtered. In this way a solid fraction A containing 65% of unsaponifiable material was removed.

The filtrate was cooled to 0° C. and a second solid fraction B was removed by filtration and washed with acetone at 0° C. It was of iodine value 35.7 and contained 1.2% of unsaponifiable material.

20 g. of fraction B was mixed with 3.19 g. of fraction A to give a mixture C containing 10% of unsaponifiable material.

Plain chocolates were made from a blend of 23 g. of the mixture C, 400 g. of refiner paste and 42.9 g. of a palm oil fraction of iodine value 34.5. The chocolates were of excellent quality.

We claim:
1. A fat composition suitable for replacing 25–50% of the cocoa butter in chocolate and other kinds of confectionery containing cocoa butter, said composition being composed substantially of a mixture of (a) a fat selected from the class consisting of palm oil and fractions thereof of iodine value at least 25 and dilatation not greater than 600 at 35° C. and (b) a shea butter fraction of iodine value not greater than 80 dilatation not less than 1,900 at 20° C. and not less than 1,500 at 35° C.

2. A composition according to claim 1 wherein (a) is of dilatation not less than 1,700 at 20° C. and not greater than 300 at 35° C. and constitutes 25 to 80% by weight of the composition.

3. A composition according to claim 1 wherein (b) is a fraction of shea butter differing from whole shea butter by the absence of a lower melting fraction, amounting to 40 to 70% of the whole of the shea butter, and by the absence of a fraction, amounting to 2 to 5% of the whole shea butter rich in unsaponifiable material.

4. A confectionery product containing fat, wherein the said fat comprises a composition claimed in claim 1.

5. A fat composition suitable for replacing 25 to 50% of the cocoa butter in chocolate and other kinds of confectionery containing cocoa butter, said composition being composed substantially of a mixture of (a) a fat selected from the class consisting of palm oil and fractions thereof of iodine value at least 25 and dilatation not greater than 600 at 35° C. and (b) a shea butter fraction of iodine value 29 to 40, dilatation not less than 2200 at 20° C. and not less than 2000 at 35° C., (a) constituting 25 to 65% of the composition.

6. A chocolate product in which the fat is composed substantially of cocoa butter and a minor proportion of milk fat in admixture with a composition claimed in claim 5.

7. A composition according to claim 5, wherein (a) amounts to 35 to 50% of the weight of the composition and consists of whole palm oil.

8. A composition according to claim 5, wherein (a) is a palm oil fraction differing from whole palm oil by the absence of a lower melting fraction, amounting to 40 to 60% of the whole palm oil.

9. A composition according to claim 5, wherein (a) is a palm oil fraction differing from whole palm oil by the absence of a lower melting fraction, amounting to 40 to 60% of the whole palm oil and of a higher melting fraction amounting to 5 to 15% of the whole palm oil.

10. A composition according to claim 5, wherein (a) is of iodine value 30 to 55.

11. A composition according to claim 5, wherein (a) is of iodine value 30 to 43 and dilatation not less than 1,700 at 20° C. and not greater than 300 at 35° C.

12. A composition according to claim 5, of dilatation not less than 1,700 at 20° C. and not greater than 200 at 35° C.

13. A chocolate product in which the fat is composed substantially of a mixture of cocoa butter and a composition claimed in claim 5.

14. A composition according to claim 5, wherein (a) is a palm oil fraction differing from whole palm oil by the absence of a lower melting fraction, amounting to 40 to 60% of the whole palm oil and of a higher melting fraction amounting to 5 to 15% of the whole palm oil, (b) is a fraction of shea butter differing from whole shea butter by the absence of a lower melting fraction, amounting to 45 to 55% of the whole shea butter and by the absence of a fraction, amounting to 2 to 3% of the whole shea butter, rich in unsaponifiable material.

References Cited in the file of this patent

UNITED STATES PATENTS

| | | |
|---|---|---|
| 2,442,536 | Eckey | June 1, 1948 |
| 2,726,158 | Cochran et al. | Dec. 6, 1955 |
| 2,903,363 | Farr | Sept. 8, 1959 |

OTHER REFERENCES

"Industrial Oil and Fat Products," Second Edition, Bailey, Interscience Publishers, Inc., New York, 1951, pages 577–580, 867 and 868.

"Vegetable Fats and Oils," by Eckey, Reinhold Publishing Corporation, New York, 1954, pages 711–714.

"The Chemistry Flavouring and Manufacture of Chocolate Confectionery and Cocoa," by Jensen, J. and A. Churchill, 40 Gloucester Place, Portman Square, London, 1931, page 212.